(12) United States Patent
Watanabe

(10) Patent No.: US 11,606,543 B2
(45) Date of Patent: Mar. 14, 2023

(54) IMAGE PROCESSING APPARATUS, IMAGE CAPTURE APPARATUS, AND IMAGE PROCESSING METHOD

(71) Applicant: CANON KABUSHIKI KAISHA, Tokyo (JP)

(72) Inventor: Kyohei Watanabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 74 days.

(21) Appl. No.: 17/179,896

(22) Filed: Feb. 19, 2021

(65) Prior Publication Data
US 2021/0266507 A1 Aug. 26, 2021

(30) Foreign Application Priority Data
Feb. 26, 2020 (JP) .............................. JP2020-030851

(51) Int. Cl.
*H04N 9/73* (2006.01)
*G06T 7/90* (2017.01)
*G06V 20/00* (2022.01)

(52) U.S. Cl.
CPC .............. *H04N 9/735* (2013.01); *G06T 7/90* (2017.01); *G06V 20/38* (2022.01); *G06T 2207/10024* (2013.01); *G06T 2207/20081* (2013.01)

(58) Field of Classification Search
None
See application file for complete search history.

(56) References Cited

U.S. PATENT DOCUMENTS

| 9,402,063 | B2 | 7/2016 | Kuchiki | |
| 2006/0284991 | A1* | 12/2006 | Ikeda | H04N 9/643 348/E9.04 |
| 2010/0073510 | A1* | 3/2010 | Nemoto | H04N 5/2351 348/E5.037 |
| 2015/0022684 | A1* | 1/2015 | Kaida | H04N 5/202 348/223.1 |
| 2019/0052803 | A1* | 2/2019 | Urano | H04N 5/2351 |

FOREIGN PATENT DOCUMENTS

| JP | 2013168723 A | 8/2013 |
| JP | 2015228546 A | 12/2015 |

* cited by examiner

*Primary Examiner* — James M Hannett
(74) *Attorney, Agent, or Firm* — Rossi, Kimms & McDowell LLP

(57) ABSTRACT

An image processing apparatus for controlling white balance of an image is provided. The apparatus detects a white region from image data and calculates a first white balance correction value based on data of the white region. The apparatus also detects, with use of machine learning, a region of a subject that has a preset specific color, from the image data, and calculates a second white balance correction value based on a color of the region of the subject. The apparatus calculates a white balance correction value to be applied to the image data, based on the first white balance correction value and the second white balance correction value.

14 Claims, 12 Drawing Sheets

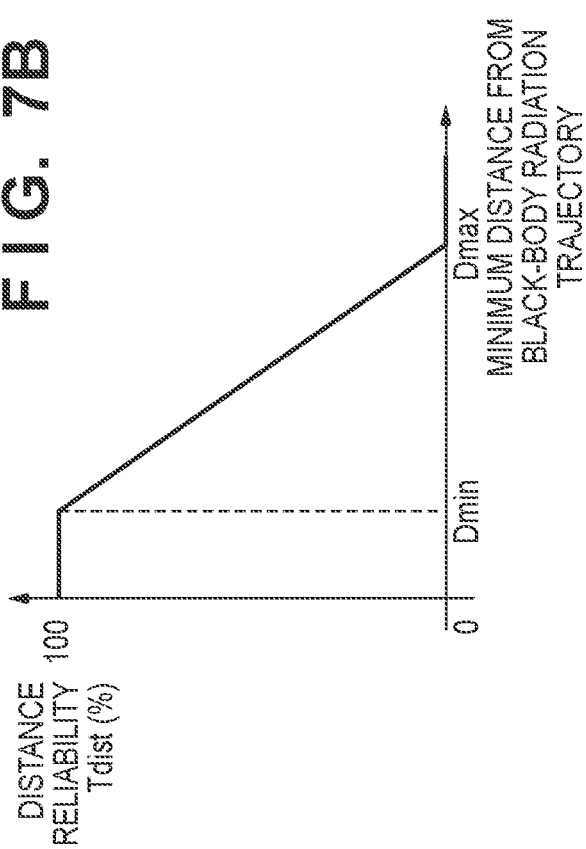
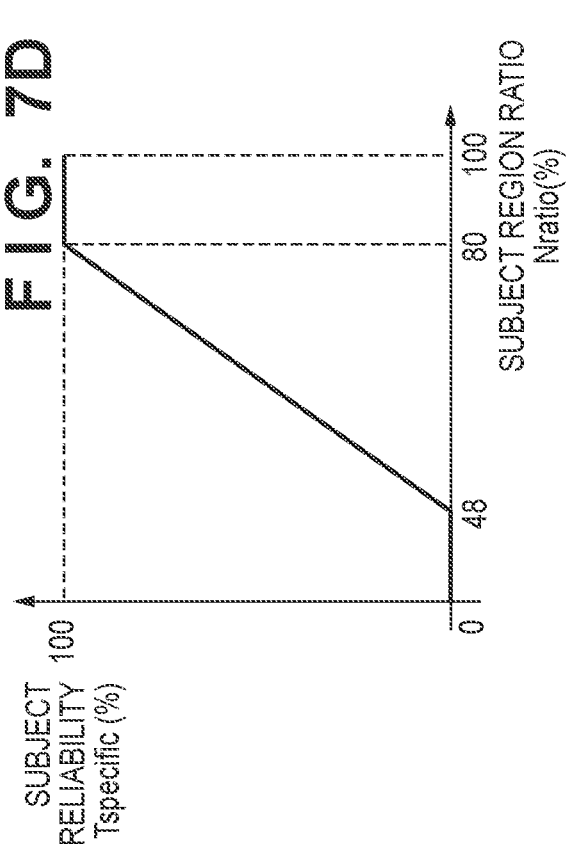
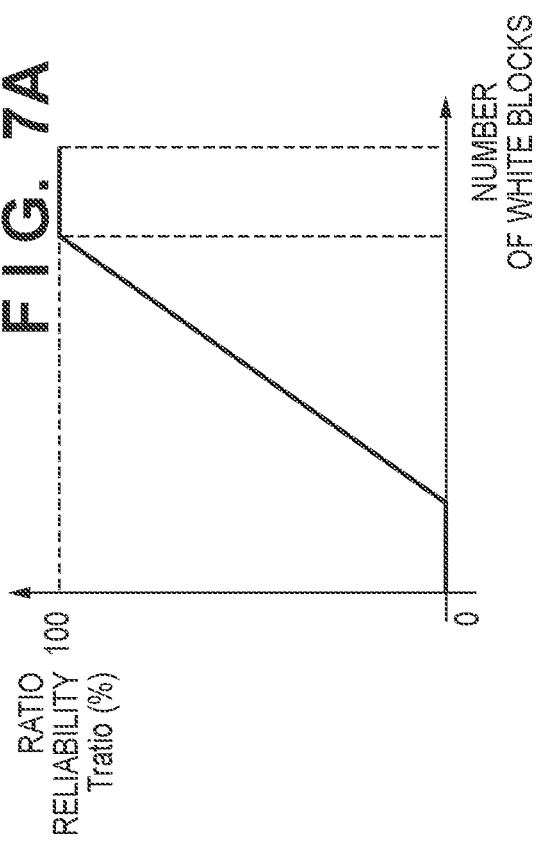
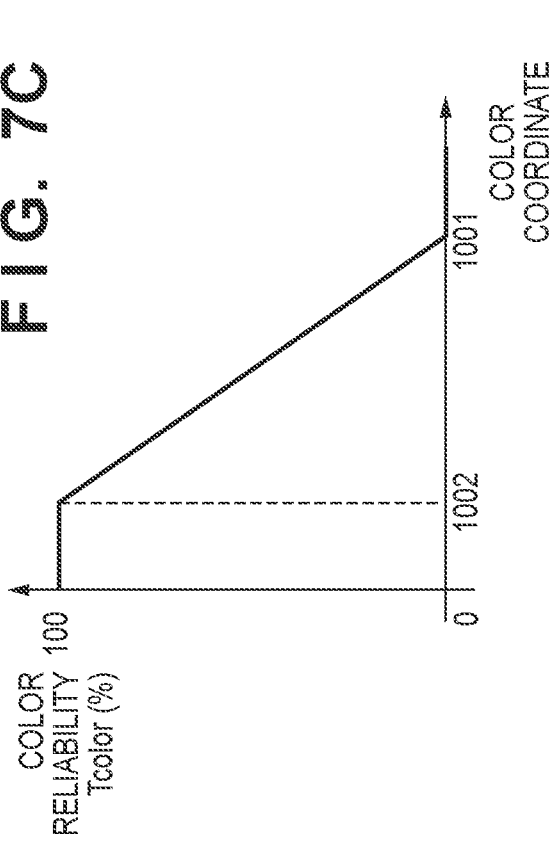

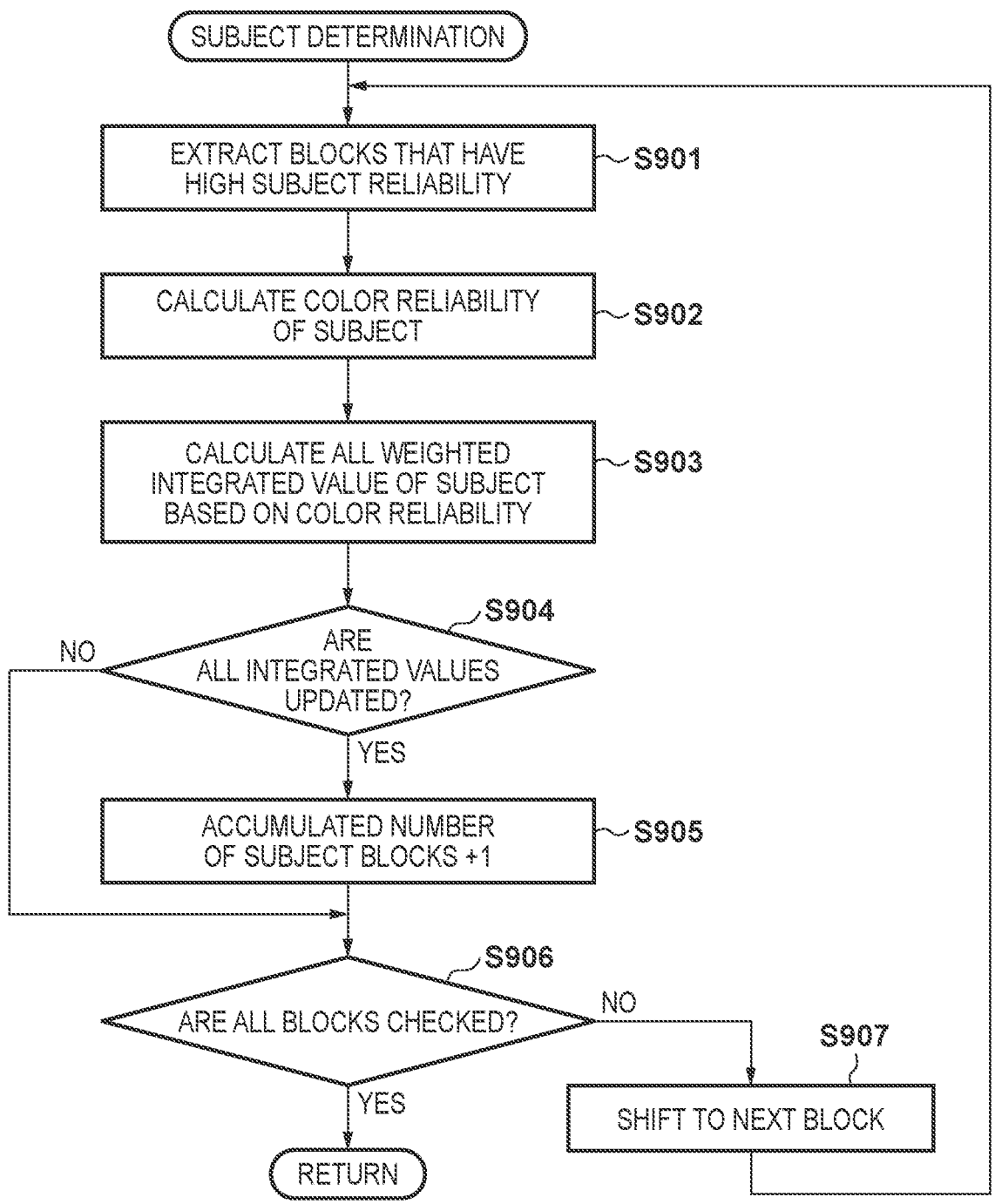

IMAGE PROCESSING APPARATUS, IMAGE CAPTURE APPARATUS, AND IMAGE PROCESSING METHOD

BACKGROUND OF THE INVENTION

Field of the Invention

The present invention relates to an image processing apparatus, an image capture apparatus, and an image processing method. The present invention especially relates to a white balance control technique.

Description of the Related Art

In order to generate a shot image that has appropriate tones, it is necessary to control white balance of an image with high accuracy. Furthermore, in order to perform white balance control with high accuracy, it is necessary to distinguish between the colors of subjects and the color of a light source with high accuracy.

Especially, it is essential to distinguish the colors of subjects that give an image of specific colors, such as green colors of plants and human skin colors, from the color of a light source with high accuracy. Japanese Patent Laid-Open No. 2015-228546 proposes a technique to detect the amount of infrared rays in a shooting scene, and distinguish between green colors of plants in a dark place, such as a shaded area, and green colors attributed to the color of a light source.

On the other hand, a technique has been proposed in which the respective degrees of similarity between each of clear sky, a shaded area, an electric light bulb, and a fluorescent lamp and ambient light are calculated using a support-vector machine (SVM) that has performed machine learning for clear sky, the shaded area, the electric light bulb, and the fluorescent lamp, and a neural network specifies the type of an ambient light source based on the calculated degrees of similarity (Japanese Patent Laid-Open No. 2013-168723).

With the technique proposed by Japanese Patent Laid-Open No. 2015-228546, a configuration for detecting the amount of infrared rays is required. Therefore, the cost and the installation space of required components can become a problem.

On the other hand, with the technique proposed by Japanese Patent Laid-Open No. 2013-168723, a configuration for detecting the amount of infrared rays is not required, but appropriate white balance control cannot be realized if the accuracy of the degrees of similarity calculated by the SVM and the accuracy of determination made by the neural network are low.

SUMMARY OF THE INVENTION

The present invention, in one aspect thereof, provides an image processing apparatus and an image processing method that realize white balance control with high reliability while restraining the use of special components.

According to an aspect of the present invention, there is provided an image processing apparatus, comprising: an image processing circuit that functions as: a white detection unit that detects a white region from image data; a first calculation unit that calculates a first white balance correction value based on data of the white region; a subject detection unit that detects, with use of machine learning, a region of a subject that has a preset specific color, from the image data; a second calculation unit that calculates a second white balance correction value based on a color of the region of the subject; and a third calculation unit that calculates a third white balance correction value based on the first white balance correction value and the second white balance correction value, the third white balance correction value being a white balance correction value that is applied to the image data.

According to another aspect of the present invention, there is provided an image capture apparatus, comprising: an image sensor; an image processing apparatus that calculates a white balance correction value from image data obtained by the image sensor, wherein the image processing apparatus comprises an image processing circuit that functions as: a white detection unit that detects a white region from image data; a first calculation unit that calculates a first white balance correction value based on data of the white region; a subject detection unit that detects, with use of machine learning, a region of a subject that has a preset specific color, from the image data; a second calculation unit that calculates a second white balance correction value based on a color of the region of the subject; and a third calculation unit that calculates a third white balance correction value based on the first white balance correction value and the second white balance correction value; and a development unit that applies development processing to the image data with use of the third white balance correction value.

According to a further aspect of the present invention, there is provided an image processing method executed by an image processing apparatus, the image processing method comprising: detecting a white region from image data; calculating a first white balance correction value based on data of the white region; with use of machine learning, detecting a region of a subject that has a preset specific color from the image data; calculating a second white balance correction value based on a color of the region of the subject; and calculating a third white balance correction value based on the first white balance correction value and the second white balance correction value, the third white balance correction value being a white balance correction value that is applied to the image data.

According to another aspect of the present invention, there is provided a non-transitory machine-readable medium that stores a program for causing a computer to execute an image processing method comprising: detecting a white region from image data; calculating a first white balance correction value based on data of the white region; with use of machine learning, detecting a region of a subject that has a preset specific color from the image data; calculating a second white balance correction value based on a color of the region of the subject; and calculating a third white balance correction value based on the first white balance correction value and the second white balance correction value, the third white balance correction value being a white balance correction value that is applied to the image data.

Further features of the present invention will become apparent from the following description of exemplary embodiments (with reference to the attached drawings).

BRIEF DESCRIPTION OF THE DRAWINGS

FIG. 7A to FIG. 7D are diagrams related to reliability calculation processing in an embodiment.

FIG. 9 is a flowchart related to subject determination processing in an embodiment.

DESCRIPTION OF THE EMBODIMENTS

Figure 1:
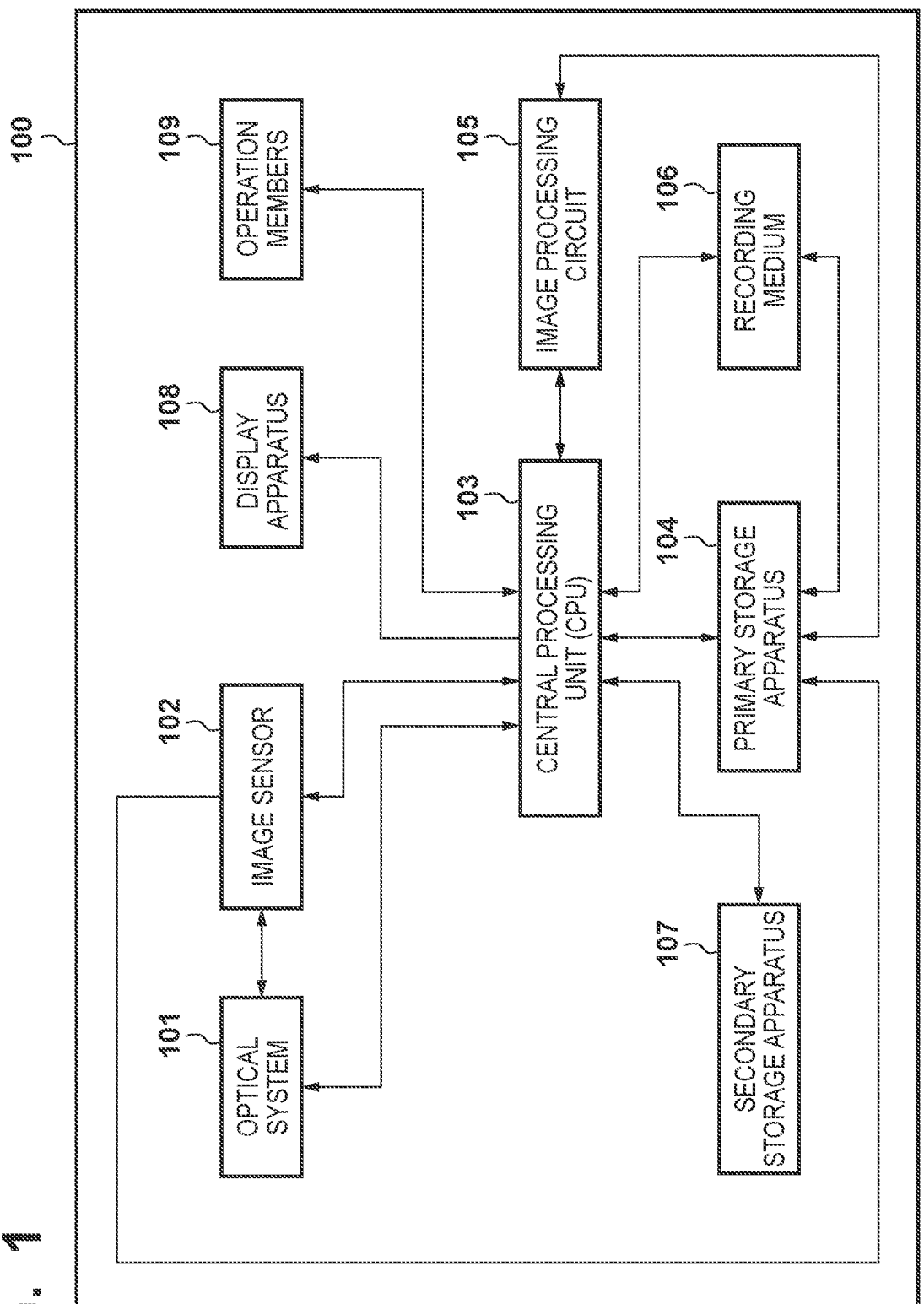
FIG. 1 is a block diagram showing an exemplary functional configuration of a camera according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that a constituent that is represented as a block in the figures can be realized by an integrated circuit (IC), such as an ASIC and an FPGA, by a discrete circuit, or by a combination of a memory and a processor that executes a program stored in the memory. Also, one block may be realized by a plurality of integrated circuit packages, and a plurality of blocks may be realized by one integrated circuit package. Furthermore, the same block may be implemented as different constituents depending on an operating environment, a required capability, and so on.

The following embodiments will be described in relation to a case where the present invention is implemented on an interchangeable-lens digital camera. However, an image capture function is not indispensable for the present invention, and the present invention can be implemented on any electronic device. Examples of such an electronic device include a video camera, a computer device (e.g., a personal computer, a tablet computer, a media player, and a PDA), a mobile telephone device, a smartphone, a game device, a robot, a drone, and a driving recorder. Note, although the present invention can be favorably implemented especially on an electronic device that does not have a function of detecting the amount of infrared rays in a shooting range, the present invention can also be implemented on an electronic device that has a function of detecting the amount of infrared rays in a shooting range.

First Embodiment

FIG. 1 is a block diagram showing an exemplary functional configuration of an image capture apparatus 100 (hereinafter referred to as a camera 100) according to a first embodiment of the present invention.

An optical system 101 of the camera 100 is a lens unit, and includes a plurality of lenses, a shutter, and a diaphragm. The optical system 101 may be or may not be interchangeable. The diaphragm may function as the shutter as well. Note that when the optical system 101 is interchangeable, the shutter is provided on the main body side of the camera 100. Note that the camera 100 may not include a mechanical shutter.

The optical system 101 forms an optical image of a subject on an image forming surface of an image sensor 102. A focus distance of the optical system 101 can be controlled by a central processing unit (CPU) 103 adjusting the position of a focus lens. Also, when the optical system 101 is a zoom lens, a focal length (an angle of view) of the optical system 101 can be controlled by the CPU 103 adjusting the position of a varifocal lens. Furthermore, the CPU 103 can obtain information of the optical system 101 (e.g., a focus lens position, a focal length, and an f-number) either directly or indirectly via a controller of the optical system 101.

The image sensor 102 is, for example, a CCD image sensor or a CMOS image sensor, and includes a plurality of pixels that have photoelectric conversion regions and are arranged two-dimensionally. Also, the image sensor 102 includes color filters that have a specific color pattern, and each pixel is provided with a filter having one color in accordance with the color pattern. Although the present invention is not dependent on the color pattern of color filters, it is assumed here that color filters based on the primary-color Bayer arrangement are provided. Therefore, each pixel is provided with a color filter in one of R (red), G (green), and B (blue). The image sensor 102 photoelectrically converts the optical image in each pixel, and converts the result of the photoelectric conversion into an analog image signal that indicates luminance information on a pixel-by-pixel basis.

The analog image signal generated by the image sensor 102 is converted into a digital image signal by an A/D converter (not shown). Note that the A/D converter may be included in the image sensor 102, or the CPU 103 may perform the A/D conversion. A pixel signal that composes the digital image signal output from the A/D converter is RAW data that has only luminance components of the color of the color filter provided for the pixel that generated this pixel signal. The CPU 103 stores RAW data into a primary storage apparatus 104. Note that the shooting sensitivity (hereinafter referred to as the ISO film speed) of the image sensor 102 is set by the CPU 103.

The CPU 103 controls respective components of the camera 100 and realizes various functions of the camera 100 by transferring a program stored in a secondary storage apparatus 107 to the primary storage apparatus 104 and executing the program. Note that at least a part of the functions that are realized by the CPU 103 executing the program in the following description may be realized by dedicated hardware, such as an ASIC.

The primary storage apparatus 104 is, for example, a volatile storage apparatus, such as a RAM. The primary storage apparatus 104 is used by the CPU 103 to execute the program, and is also used as a buffer memory for image data, a working area for image processing, a video memory for display, and so forth.

The secondary storage apparatus 107 is, for example, a rewritable, non-volatile storage apparatus, such as an EEPROM. The secondary storage apparatus 107 stores the program (instruction) that can be executed by the CPU 103, the settings of the camera 100, GUI data, and so forth.

A recording medium 106 is, for example, a rewritable, non-volatile storage apparatus, such as a semiconductor memory card. The recording medium 106 may be or may not be attachable to and removable from the camera 100. Data (e.g., still image data, moving image data, and sound data) generated by the camera 100 can be recorded into the recording medium 106. That is to say, the camera 100 has a function that allows reading and writing with respect to the recording medium 106, and a mechanism that allows the recording medium 106 to be attached and removed (when the recording medium 106 is attachable and removable). Note that the recording destination of data generated by the camera 100 is not limited to the recording medium 106. The data may be transmitted to an external device via a communication interface included in the camera 100, and recorded into a recording apparatus that can be accessed by the external device.

A display apparatus 108 is, for example, a liquid crystal display. The CPU 103 functions as a display control apparatus for the display apparatus 108. In a shooting standby state and during recording of moving images, moving images that have been shot are displayed in real time on the display apparatus 108, and the display apparatus 108 functions as an electronic viewfinder. Furthermore, the display apparatus 108 also displays image data recorded in the recording medium 106, and GUI (Graphical User Interface) images, such as a menu screen.

Operation members 109 represent input devices that each accepts a user operation. For example, buttons, levers, a touchscreen, and the like can be a part of the operation members 109. The operation members 109 may include, for example, a sound or eye-tracking input device that does not require physical operations. The input devices included in the operation members 109 are given names corresponding to the functions allocated thereto. Typical examples include a shutter button, a menu button, direction keys, a determination (set) button, a mode changing dial, and so forth. Note that different functions may be selectively allocated to one input device.

An image processing circuit 105 generates image data in different formats by applying preset image processing to image data (which may be RAW data or may be image data after development processing), and obtains and/or generates various types of information. The image processing circuit 105 may be, for example, a dedicated hardware circuit, such as an ASIC, designed to realize a specific function, or may be configured to realize a specific function through the execution of software by a programmable processor, such as a DSP.

The image processing applied by the image processing circuit 105 here includes preprocessing, color interpolation processing, correction processing, data editing processing, evaluation value calculation processing, special effects processing, and so forth. The preprocessing includes signal amplification, base level adjustment, defect pixel correction, and so forth. The color interpolation processing is processing for interpolating values of color components that are not included in image data that has been read out from pixels, and is also referred to as demosaicing processing and synchronization processing. The correction processing includes white balance control, gradation correction (gamma processing), processing for correcting the influence of optical aberration and vignetting of the optical system 101, color correction processing, and so forth. The data editing processing includes composition processing, scaling processing, encoding and decoding processing, header information generation processing, and so forth. The evaluation value calculation processing denotes generation of signals and evaluation values used in automatic focus detection (AF), processing for calculating evaluation values used in automatic exposure control (AE), and so forth. The special effects processing includes addition of blur, changing of tones, relighting processing, and so on. Note that these are examples of image processing that can be applied by the image processing circuit 105, and do not limit the image processing applied by the image processing circuit 105.

Among the image processing that the image processing circuit 105 applies to RAW data, an image processing sequence for converting RAW data into image data of a general-purpose format that can be used for display and printing as photographic data is referred to as development processing. The development processing generally includes white balance control processing and color complement processing, and can additionally include lens aberration correction processing, noise reduction (NR) processing, gamma (gradation conversion) processing, and the like.

Furthermore, in the image processing circuit 105, a sequence of image processing sets corresponding to shooting modes that can be set on the camera 100 are registered in advance. As a result, with respect to image data obtained by shooting a specific scene, such as a night view and a sunset, image processing appropriate for the scene is executed.

Note, although the image processing circuit 105 executes processing related to white balance control in the present embodiment, the CPU 103 may execute at least a part of the processing related to white balance control.

Figure 2:
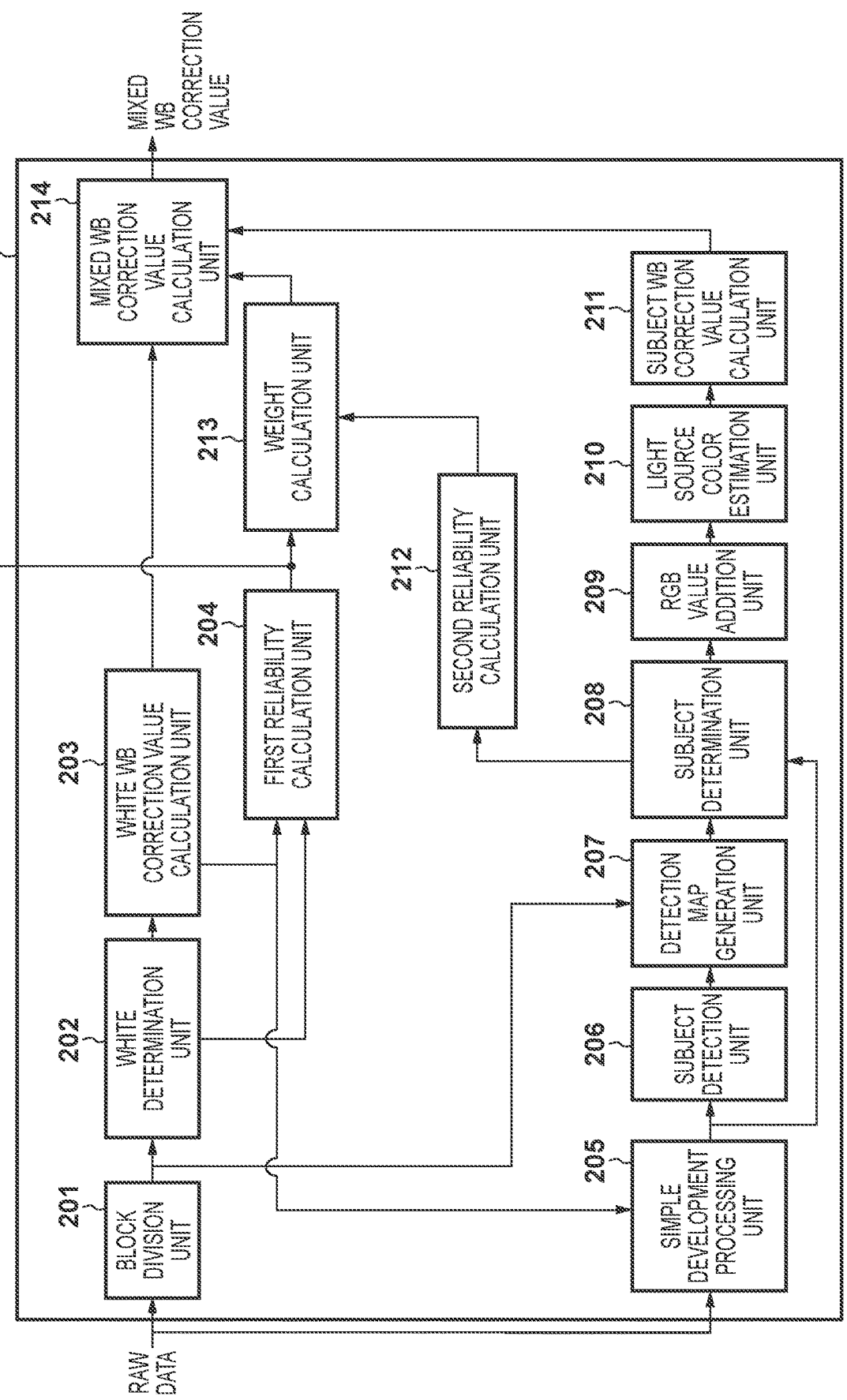
FIG. 2 is a block diagram showing an exemplary configuration of a white balance control unit realized by an image processing circuit of FIG. 1.

FIG. 2 is a block diagram showing an exemplary functional configuration of a white balance control unit 200 that controls white balance by calculating a white balance correction value in the camera 100. Hereinafter, white balance is abbreviated to WB. The WB control unit 200 represents, as one control unit, the WB control processing executed by the image processing circuit 105 (and/or the CPU 103).

The WB control unit 200 calculates a final WB correction value from a WB correction value applied to pixels that are estimated to be white (hereinafter referred to as a white WB correction value) and from a WB correction value applied to pixels of a subject (hereinafter referred to as a subject WB correction value). The operations of each block of the WB control unit 200 will be described later.

Figure 3:
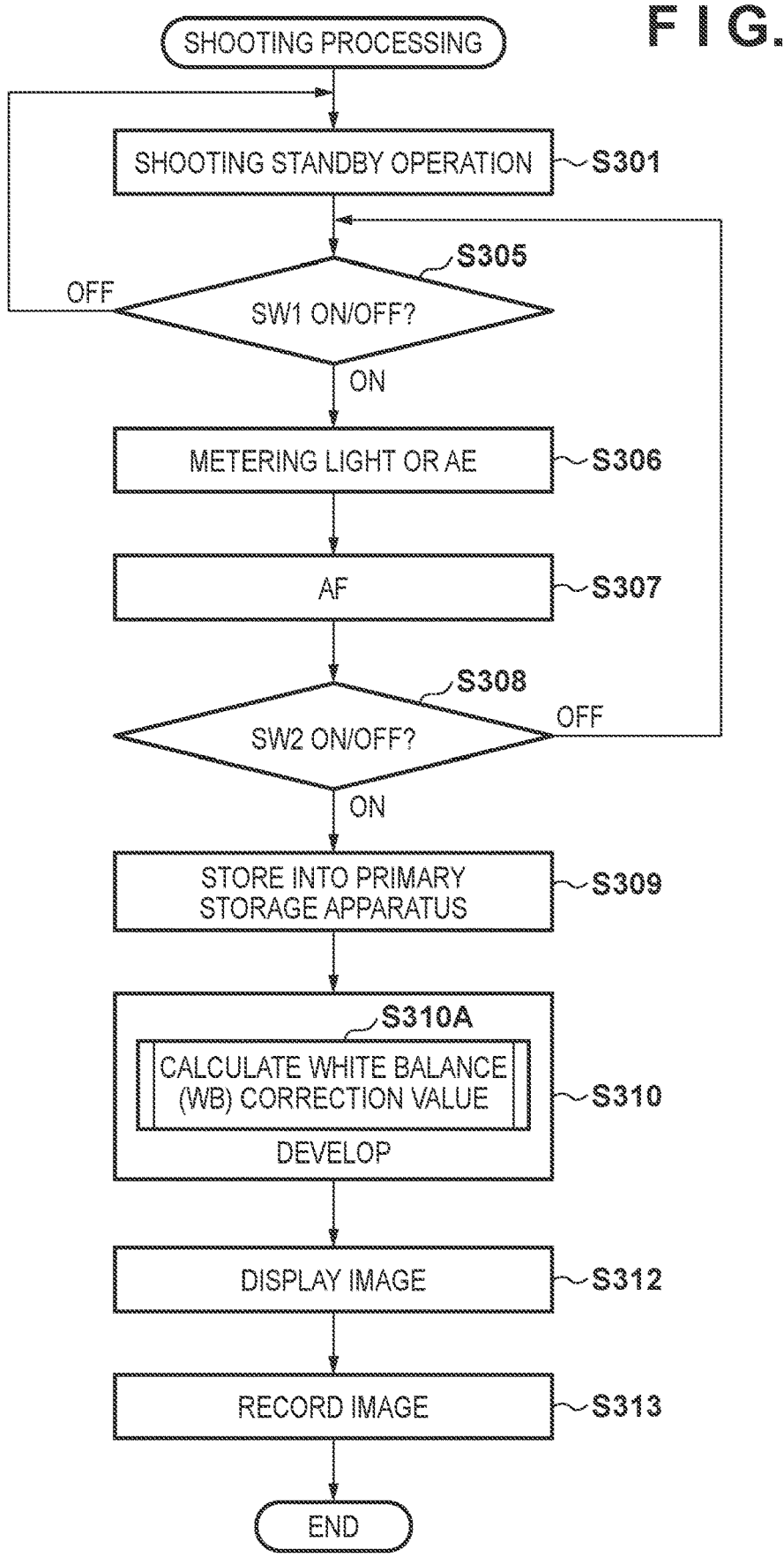
FIG. 3 is a flowchart related to shooting processing in the camera of FIG. 1.

FIG. 3 is a flowchart related to shooting processing of the camera 100. This flowchart shows a processing sequence from a time point at which the camera 100 is activated and enters the shooting standby state, to shooting of a still image based on a user instruction and recording of still image data.

When activated, the camera 100 enters the shooting standby state, and continuously executes a preset standby operation while monitoring for an operation on the operation members 109 (step S301). Specifically, as the standby operation, the CPU 103 continuously executes processing for shooting and displaying moving images, and causes the display apparatus 108 to function as a viewfinder. The CPU 103 continuously executes the standby operation until detection of a state where a preset operation that is equivalent to a shooting preparation instruction for a still image has been performed on the operation members 109. Also, with respect to an operation that is not equivalent to a shooting preparation instruction for a still image, the CPU 103 executes processing corresponding to the operation while continuing the standby operation. For example, when an operation of changing the angle of view of the optical system 101 has been detected, the CPU 103 drives the varifocal lens of the optical system 101 in accordance with the operation. Also, when an operation of changing a shooting condition (e.g., a shutter speed, an f-number, shooting sensitivity, and an exposure correction value) has been detected, the CPU 103 changes a setting value of the camera 100 in accordance with the operation. Furthermore, the CPU 103 reflects the change in the setting value in the content displayed on a live-view screen as necessary.

In step S305, the CPU 103 checks the state of SW1, which is turned ON when the shutter button is depressed halfway, as an operation that is equivalent to a shooting preparation instruction. When SW1 is ON, the CPU 103 executes step S306. When SW1 is OFF, the CPU 103 repeatedly executes steps S301 and S305.

Steps S306 and S307 represent a shooting preparation operation for a still image. When an automatic exposure (AE) mode or an automatic focus detection (AF) mode is set on the camera 100, the CPU 103 executes AE or AF as the shooting preparation operation.

In step S306, the CPU 103 obtains luminance information of shot images from the image processing circuit 105. The image processing circuit 105 calculates preset luminance information with respect to the shot images (frame images of moving images that were shot for live-view display), and outputs the luminance information to the CPU 103. The CPU 103 determines shooting conditions (a shutter speed, an f-number, and an ISO film speed) based on the luminance information.

In step S307, the CPU 103 obtains evaluation values and signals for performing AF from the image processing circuit 105. Alternatively, when the camera 100 includes an AF sensor, signals may be obtained from the AF sensor. The CPU 103 drives the focus lens of the optical system 101 so that the optical system 101 focuses on a subject inside a focus detection region with use of a known method, such as a contrast method and a phase difference detection method.

In step S308, the CPU 103 checks the state of SW2, which is turned ON when the shutter button is fully depressed, as an operation that is equivalent to a shooting instruction. When SW2 is ON, the CPU 103 executes step S309. When SW2 is OFF, the CPU 103 executes step S305.

In step S309, the CPU 103 executes still image shooting under the shooting conditions determined in step S306 (or shooting conditions set by a user), and stores RAW data into the primary storage apparatus 104.

In step S310, the CPU 103 causes the image processing circuit 105 to perform development processing with respect to the RAW data stored in the primary storage apparatus 104. As one process of the development processing, the image processing circuit 105 calculates a WB correction value (step S310A). Based on image data obtained through the development processing, the image processing circuit 105 generates image data for display, and generates a data file that stores image data for recording. The image processing circuit 105 stores the generated image data and data file into the primary storage apparatus 104. The details of processing for calculating the WB correction value in the image processing circuit 105 will be described later.

In step S312, the CPU 103 causes the display apparatus 108 to display an image based on the image data for display.

In step S313, the CPU 103 records the image data file into the recording medium 106.

Although processing ends with step S313 here, processing may return to the shooting standby operation (step S301) again in practice. Also, a data file that stores the RAW data may be recorded into the recording medium 106.

Figure 4:
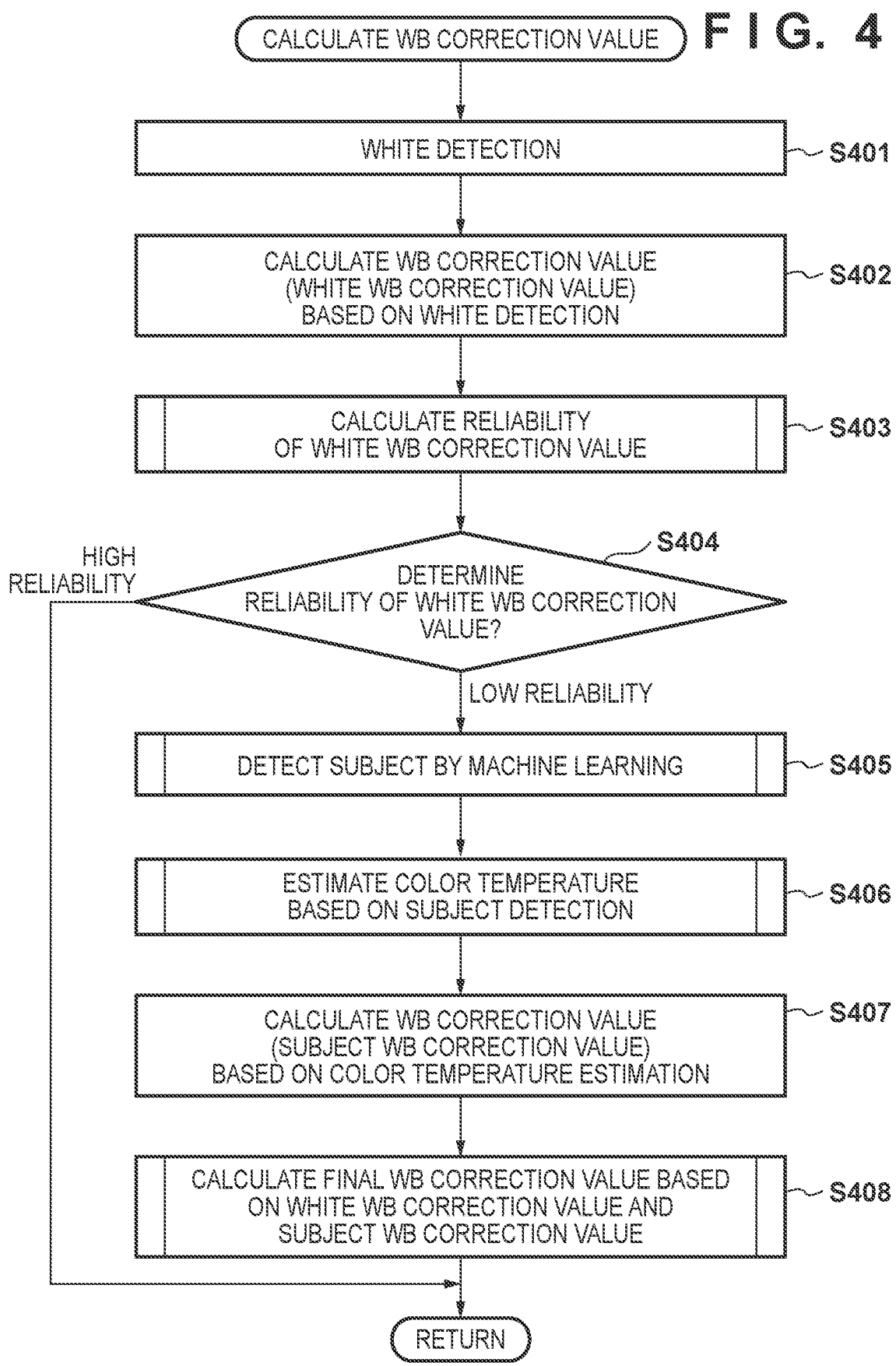
FIG. 4 is a flowchart related to processing for computing a WB correction value in an embodiment.

FIG. 4 is a flowchart related to the details of the processing for calculating the WB correction value (step S310A), which is executed by the image processing circuit 105 (WB control unit 200) as one process of the development processing in step S310 of FIG. 3. The following describes the details of the processing for calculating the WB correction value with reference to FIG. 2 and FIG. 4.

(Step S401: White Detection)

A block division unit 201 divides the RAW data stored in the primary storage apparatus 104 into a plurality of pieces of block data. One piece of block data is data corresponding to one of a plurality of block regions obtained by dividing a shot image into a plurality of sections in the horizontal direction and the vertical direction. Then, the block division unit 201 integrates pixel data values included in the pieces of block data for each of the colors of the color filters. As a result, for each piece of block data, integrated values of R components, G components, and B components are obtained. Subsequently, for each piece of block data, the block division unit 201 obtains the ratios of R components and B components to G components (R/G and B/G), and outputs the ratios to a white determination unit and a detection map generation unit.

A white determination unit 202 determines that, among the pieces of block data, block data that has R/G and B/G included in a white region (a white detection region), which has been set in an R/G-B/G coordinate system in advance, is data of a white block. With respect to data of all white blocks, the white determination unit 202 calculates integrated values Rinteg, Ginteg, and Binteg for respective color components, and outputs them to a white WB correction value calculation unit 203.

Figure 5:
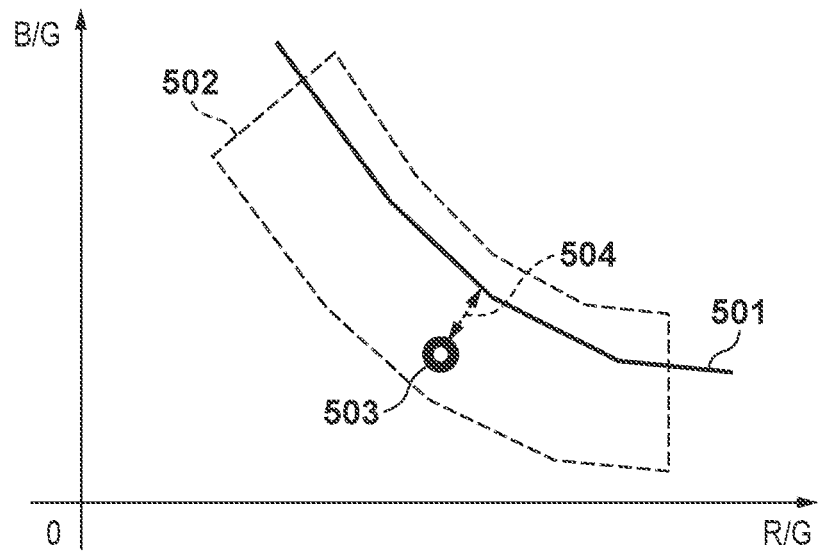
FIG. 5 is a diagram related to the operations of a white determination unit of an embodiment.

FIG. 5 is a diagram showing an exemplary setting of a white region that is used in determining white blocks. In FIG. 5, a horizontal axis represents R/G, and a vertical axis represents B/G. 501 denotes a black-body radiation trajectory, and 502 denotes a white region. The white region 502 is set to include R/G and B/G that have been obtained with respect to images shot by the camera 100 in relation to subjects with achromatic colors under various light sources, such as sunlight (a sunlit area and a shaded area), tungsten light, mercury light, fluorescent light, and flash light.

(Step S402: Calculation of White WB Correction Value)

Using the expressions (1), the white WB correction value calculation unit 203 calculates a WB correction value (a white WB correction value) based on the integrated values Rinteg, Ginteg, and Binteg for respective color components, which were calculated with respect to data of white blocks that have R/G and B/G included inside the white region 502. The WB correction value is a gain (coefficient) that is applied to respective color components.

$R$ gain $W\_WB\_R$gain for white $WB$ correction value=$Ginteg/Rinteg$ $G$ gain $W\_WB\ G$gain for white $WB$ correction value=$Ginteg/Ginteg$ $B$ gain $W\_WB\_B$gain for white $WB$ correction value=$Ginteg/Binteg$ (1)

The white WB correction value calculation unit 203 outputs the calculated white WB correction value to a mixed WB correction value calculation unit 214 and a first reliability calculation unit 204.

(Step S403: Calculation of Reliability of White WB Correction Value)

Figure 6:
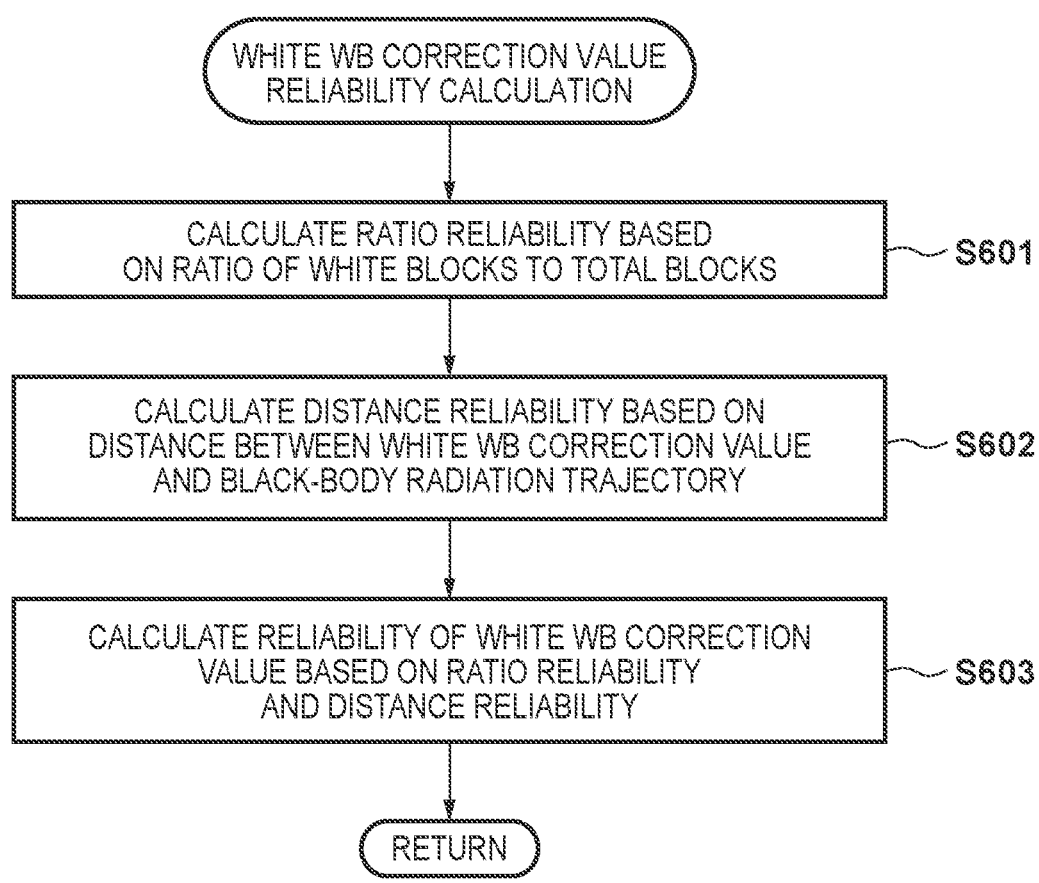
FIG. 6 is a flowchart related to processing for calculating the reliability of a white WB correction value in an embodiment.

The first reliability calculation unit 204 calculates the reliability of the white WB correction value. FIG. 6 is a flowchart showing the details of calculation of the reliability of the white WB correction value in step S403.

(Step S601: Calculation of Ratio Reliability)

The first reliability calculation unit 204 calculates the reliability (ratio reliability Tratio) of the white WB correction value based on the ratio of the number of pieces of block data that were determined to be data of white blocks in step S401 to the total number of pieces of block data. This ratio is also the ratio of white blocks to the entire image.

In calculating the ratio reliability Tratio, the first reliability calculation unit 204 calculates the ratio reliability Tratio (%) based on a relationship between the ratio of white blocks and the ratio reliability shown in FIG. 7A. In FIG. 7A, a horizontal axis represents the ratio of white blocks, and a vertical axis represents the ratio reliability Tratio (%); the larger the ratio of white blocks, the higher the ratio reliability Tratio. Note that the horizontal axis may represent the total number of white blocks. The first reliability calculation unit 204 holds the relationship shown in FIG. 7A as a table (a ratio reliability table), and can obtain the ratio reliability Tratio (%) by referring to the table with use of the number of white blocks.

(Step S602: Calculation of Distance Reliability)

Subsequently, using the expressions (2), the first reliability calculation unit 204 obtains the coordinates of the white WB correction value in the R/G-B/G space based on W_WB_Rgain and W_WB_Bgain for the white WB correction value that were calculated by the white WB correction value calculation unit 203 in step S402.

$$R/G \text{ corresponding to white } WB \text{ correction value} = 1/W\_WB\_R\text{gain}$$

$$B/G \text{ corresponding to white } WB \text{ correction value} = 1/W\_WB\_B\text{gain} \qquad (2)$$

Then, as shown in FIG. 5, the first reliability calculation unit 204 calculates the shortest distance 504 between the (R/G, B/G) coordinates 503 corresponding to the white WB correction value and the black-body radiation trajectory 501. The first reliability calculation unit 204 calculates a distance reliability Tdist (%) based on a relationship between the shortest distance 504 and the distance reliability shown in FIG. 7B.

In FIG. 7B, a horizontal axis represents the shortest distance 504 between the (R/G, B/G) coordinates 503 corresponding to the white WB correction value and the black-body radiation trajectory 501, and a vertical axis represents Tdist (%), which is the reliability of distance from the black-body radiation trajectory 501. Note that the distance reliability Tdist (%) can be set so that it increases as the shortest distance 504 decreases. In FIG. 7B, the minimum distance Dmin and the maximum distance Dmax that respectively correspond to a distance reliability Tdist of 100% and a distance reliability Tdist of 0% can be set experimentally in advance, for example. Note that the shorter the shortest distance 504, that is to say, the closer the coordinates of the white WB correction value to a point on the black-body radiation trajectory 501 in the R/G-B/G coordinate system, the higher the possibility that block regions with achromatic colors under natural light, rather than mercury light, have been determined to be white blocks.

(Step S603: Calculation of Reliability of White WB Correction Value)

Next, using the expression (3), the first reliability calculation unit 204 calculates the final reliability Twhite (%) of the white WB correction value based on the ratio reliability Tratio (%) and the distance reliability Tdist (%).

$$T\text{white}(\%) = T\text{ratio}(\%) \times T\text{dist}(\%)/100 \qquad (3)$$

The first reliability calculation unit 204 outputs the calculated reliability Twhite (%) to a weight calculation unit 213 and the CPU 103. The foregoing is processing for calculating the reliability of the white WB correction value.

(Step S404: Determination about Reliability of White WB Correction Value)

Next, the CPU 103 determines whether the reliability Twhite of the white WB correction value calculated in step S403 is high reliability or low reliability. Here, as one example, the CPU 103 determines that the reliability Twhite (%) is high reliability when the reliability Twhite (%) is equal to or higher than a predetermined threshold. High reliability means that there is a high possibility that achromatic colors have been detected under natural light. Also, the reliability Twhite (%) is determined to be low reliability when the reliability Twhite (%) is lower than the predetermined threshold.

When the reliability Twhite is determined to be high reliability, the CPU 103 controls the image processing circuit 105 so that the image processing circuit 105 ends the processing for calculating the WB correction value and performs the development processing with respect to the RAW data with use of the calculated white WB correction value.

On the other hand, when the reliability Twhite is determined to be low reliability, the CPU 103 causes the image processing circuit 105 to calculate a WB correction value based on a subject.

Note that the determination processing of step S404 may be implemented by the image processing circuit 105. Also, it is permissible to skip the determination processing of step S404 and always execute processing of step S405 onward.

(Step S405: Detection of Subject Region)

A simple development processing unit 205 applies simple development processing to the RAW data stored in the primary storage apparatus 104. The simple development processing may be, for example, development processing that uses the RAW data with reduced resolution and the white WB correction value that has been calculated by the white WB correction value calculation unit 203. The simple development processing unit 205 outputs image data obtained by applying the development processing to a subject detection unit 206 and a subject determination unit 208.

The subject detection unit 206 applies subject detection processing to the image data that has undergone the simple development. A subject detected by the subject detection unit 206 may be, but is not limited to, a subject with colors that are considered to be difficult in terms of white balance control (e.g., greenish or green colors of plants, human skin colors, and the like).

Although a subject detection method is not limited in a particular way, it is possible to use, for example, machine learning that uses a convolutional neural network (CNN) and the like, especially deep learning. Although a learning method is not limited in a particular way, it may be, for example, supervised learning that uses image data obtained by shooting a subject with colors that are desired to be detected under various types of light sources and brightness. When there are multiple types of subjects to be detected, learning is performed on a subject-by-subject basis.

A subject detected by the subject detection unit 206 can be selected from among, for example, a plurality of subject candidates that have been stored in the secondary storage apparatus 107 in advance, either automatically in accordance with, for example, a shooting mode and the like set on the camera 100 or in line with user settings. Note that the subject detection processing may be applied multiple times to detect different subjects from the same RAW data.

It is assumed here that the subject detection unit 206 determines whether each pixel in the input image data is a pixel of a subject (color) to be detected, and generates a binary image composed of pixels that have values indicating the determination result (e.g., 1 or 0). Alternatively, the subject detection unit 206 may categorize an input piece of two-dimensional block data as an image block of a subject with a specific color or an image block of another subject.

A detection map generation unit 207 generates a subject detection map from the result of detection by the subject detection unit 206. The detection map generation unit 207 obtains, for each of partial regions which are included in the image data that underwent the simple development and which correspond to, for example, the block regions generated by the block division unit 201, the percentage of pixels that have been determined to have a specific color, and generates a detection map in accordance with the percentages. Alternatively, the detection map generation unit may generate the detection map based on the probabilities that the blocks are image blocks of a subject with a specific color, which have been obtained by the subject detection unit 206.

Figure 8A:
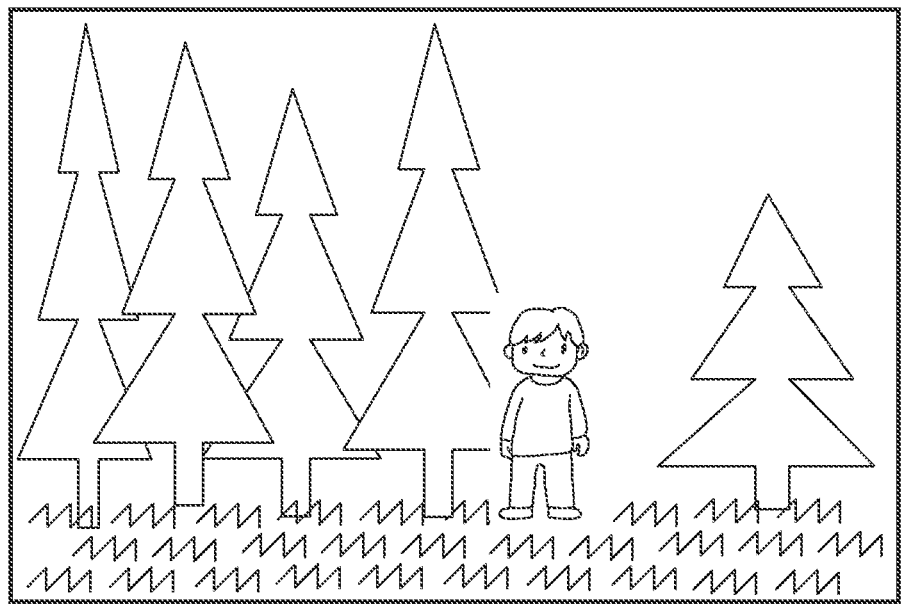
FIG. 8A and FIG. 8B are diagrams related to detection map generation processing in an embodiment.
Figure 8B:
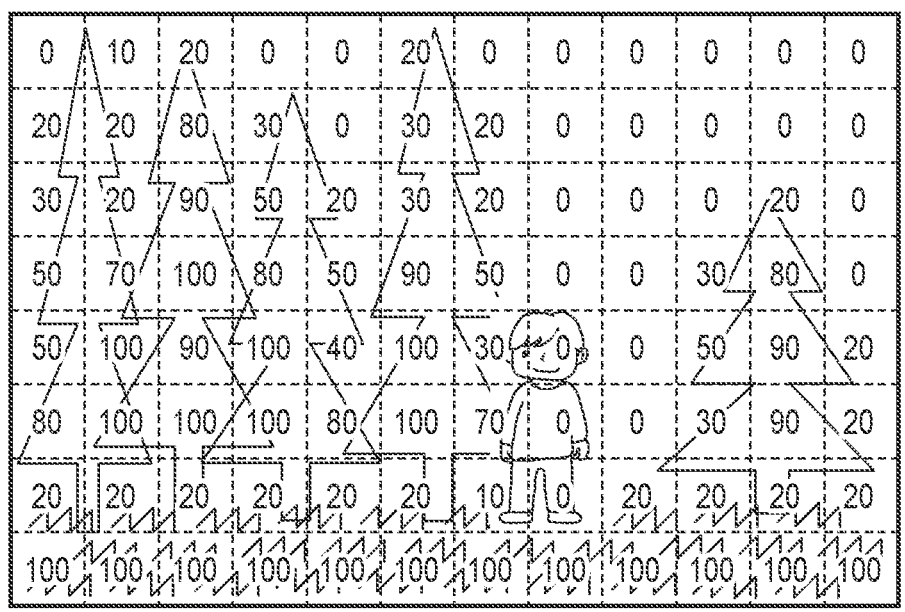

For example, assume that a subject to be detected is pixels with "green of plants". Assume a case where developed image data based on RAW data that is obtained by shooting a scene shown in FIG. 8A has been input to the subject detection unit 206. In this case, the detection map generation unit 207 generates a detection map shown in FIG. 8B. For each partial region, the percentage of pixels that have been determined to have a specific color is regarded as reliability, and is shown as a value between 0% and 100% in the detection map. Although the reliability is rounded in increments of 10% in an example of FIG. 8B, the reliability may be set in increments of 1%. The closer the reliability is to 100%, the more likely the region has a subject (color) to be detected.

(Step S406: Color Temperature Estimation Based on Subject Detection)

The detection map generation unit 207 outputs the generated detection map to the subject determination unit 208. With respect to partial regions that have high reliability in the detection map, the subject determination unit 208 determines the credibility of their reliability. The determination may be based on, for example, colors. The following describes a determination method based on colors.

FIG. 9 is a flowchart related to subject determination processing of the subject determination unit 208.

In step S901, the subject determination unit 208 extracts, from the image data that underwent the simple development, image data of partial regions that have high reliability (for example, equal to or higher than a threshold (e.g., 80%)) in the detection map.

In step S902, the subject determination unit 208 extracts, from pixels included in the extracted image data, pixels with colors that are included in a color detection region (color detection frame) that has been set in advance with respect to a detected subject. The subject determination unit 208 obtains color reliability Tcolor of each pixel in accordance with a relationship between the (R/G, B/G) coordinates of the extracted pixels and the color detection region. FIG. 7C is a diagram showing an exemplary relationship between the color coordinates of pixels and the color reliability Tcolor (%).

Figure 10A:
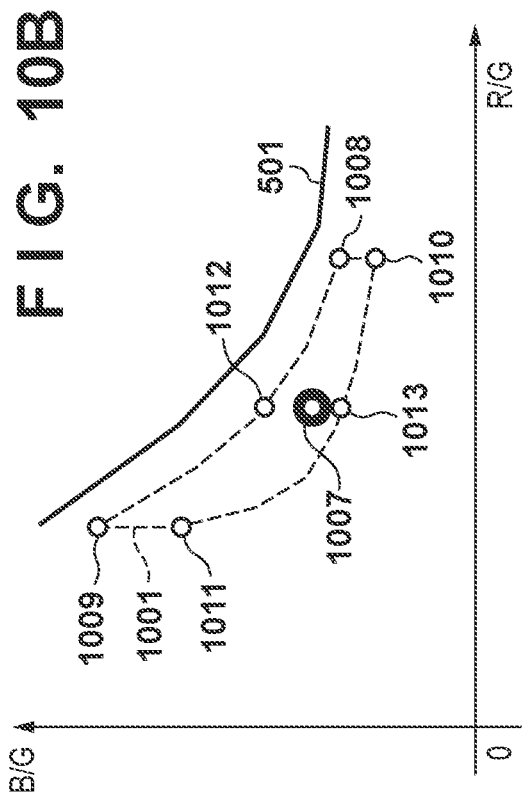
FIG. 10A to FIG. 10D are diagrams related to processing for calculating a WB correction value in an embodiment.

In FIG. 7C, coordinates 1001, 1002 are coordinates corresponding to outer edges of regions that are given the same reference signs in FIG. 10A. The outer region 1001 represents the color detection frame. FIG. 7C indicates that pixels with color coordinates that are included in the region 1002, which is set inside the color detection frame 1001, have a color reliability Tcolor of 100(%), whereas pixels with color coordinates that are outside the color detection frame 1001 have a color reliability Tcolor of 0(%). Pixels with color coordinates that are included in a region from the outer edge of the region 1002 to the outer edge of the color detection frame 1001 have color reliability Tcolor that is lower than 100% and higher than 0%. The subject determination unit 208 obtains color reliability Tcolor of a partial region by, for example, obtaining average color reliability Tcolor of respective pixels.

In step S903, with respect to the partial regions that have high reliability in the detection map, an RGB value addition unit 209 integrates color components of pixels with colors that are included inside the color detection frame. At this time, corresponding color reliability Tcolor is used as a weight.

Provided that the integrated values of R, G, and B components are RintegA, GintegA, and BintegA, respectively, the integrated values are obtained using the following expressions (4).

$$RintegA = RintegA + Rij \times (Tcolor/100)$$

$$GintegA = GintegA + Gij \times (Tcolor/100)$$

$$RintegA = BintegA + Bij \times (Tcolor/100) \quad (4)$$

Here, Rij is an integrated value of R components in a partial region that is $i^{th}$ in the horizontal direction and $i^{th}$ in the vertical direction (where i, j are integers equal to or larger than one). The same goes for Gij and Bij. As integration is not performed with respect to partial regions that have low reliability in the detection map, i and j are not necessarily consecutive values.

Obtaining integrated values in consideration of the color reliability Tcolor in the foregoing manner makes it possible to suppress the influence of block regions that have high reliability in terms of subject detection based on machine learning but include many pixels that do not have a target subject color. This enables highly accurate white balance control even when the accuracy of subject detection based on machine learning is low.

In calculating integrated values in consideration of the color reliability Tcolor, color components of pixels corresponding to coordinates that are outside the color detection frame 1001, as with color coordinates 1006 in FIG. 10A, are not integrated. On the other hand, color components of a pixel corresponding to color coordinates 1003, which are included in the region 1002 set inside the color detection frame 1001, are added (integrated) as is. Also, color components of a pixel corresponding to color coordinates 1004, which are included in the color detection frame 1001 but is not included in the region 1002, are added at a percentage that is larger than 0% and smaller than 100% in accordance with the color coordinates. For example, provided that the distance between coordinates A on the color detection frame 1001 that are closest from the color coordinates 1004 and coordinates B on the region 1002 that are closest from the color coordinates 1004 is 100, the magnitude of the distance from the color coordinates 1004 to the coordinates B can be used as the color reliability Tcolor.

Upon completion of addition processing for all partial regions which are included in the image data that underwent the simple development and which have high reliability in the detection map, the (R/G, B/G) coordinates are obtained based on the integrated values RintegA, GintegA, and BintegA. Reference numeral 1007 denotes coordinates (RintegA/GintegA, BintegA/GintegA).

When the RGB value addition unit 209 has finished addition processing for one partial region in step S903, it outputs integrated values at that point to the CPU 103.

In step S904, the CPU 103 compares these integrated values with the integrated values that were obtained with respect to an immediately previous partial region to determine whether all of the integrated values RintegA, GintegA, and BintegA have been updated. The CPU 103 outputs the determination result to a second reliability calculation unit.

When it is determined that all of the integrated values RintegA, GintegA, and BintegA have been updated, the CPU 103 considers the partial region to which addition processing was applied in step S903 as a partial region that has the color to be detected. When it is determined that at least one of the integrated values RintegA, GintegA, and BintegA has not been updated, the CPU 103 considers the partial region as a partial region that does not have the color to be detected.

In step S905, in accordance with the following expression (5), the second reliability calculation unit 212 counts the number of partial regions in which all of the integrated values RintegA, GintegA, and BintegA were determined to have been updated by the CPU 103. The counted value Ntotal represents the total number of partial regions that have the color to be detected.

$$Ntotal=Ntotal+1 \quad (5)$$

In step S906, the CPU 103 determines whether the determination of step S904 has been made with respect to all of the partial regions that have high reliability in the detection map. When it is determined that the determination of step S904 has been made with respect to all of the partial regions that have high reliability in the detection map, the CPU 103 ends the subject determination processing. When it is not determined that the determination of step S904 has been made with respect to all of the partial regions that have high reliability in the detection map, the CPU 103 causes the subject determination unit 208 to perform processing with respect to the next partial region.

The second reliability calculation unit 212 calculates the ratio Nratio of partial regions that have the color to be detected to the image data that underwent the simple development based on the counted value Ntotal with use of the following expression (6), and outputs the ratio Nratio to the weight calculation unit 213.

$$Nratio=Ntotal/\text{the total number of divisions} \times 100 \quad (6)$$

Here, the total number of divisions is equal to the number of the block regions generated by the block division unit 201. Therefore, the ratio Nratio is also the ratio of the regions that have the specific color to the entire image represented by the RAW data.

Meanwhile, a light source color estimation unit 210 estimates the color temperature of ambient light based on the coordinates in the R/G-B/G coordinate system that are obtained from the integrated values RintegA, GintegA, and BintegA calculated by the RGB addition unit 209 (the coordinates 1007 in FIG. 10A).

Figure 10B:
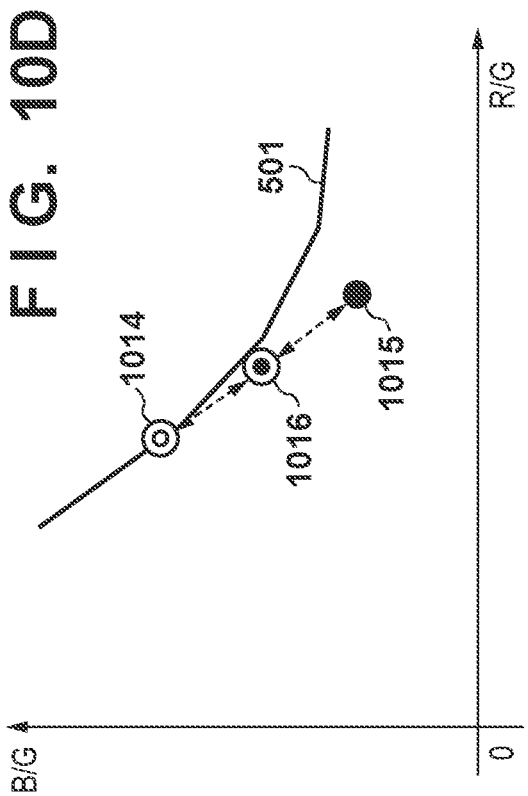
Figure 11:
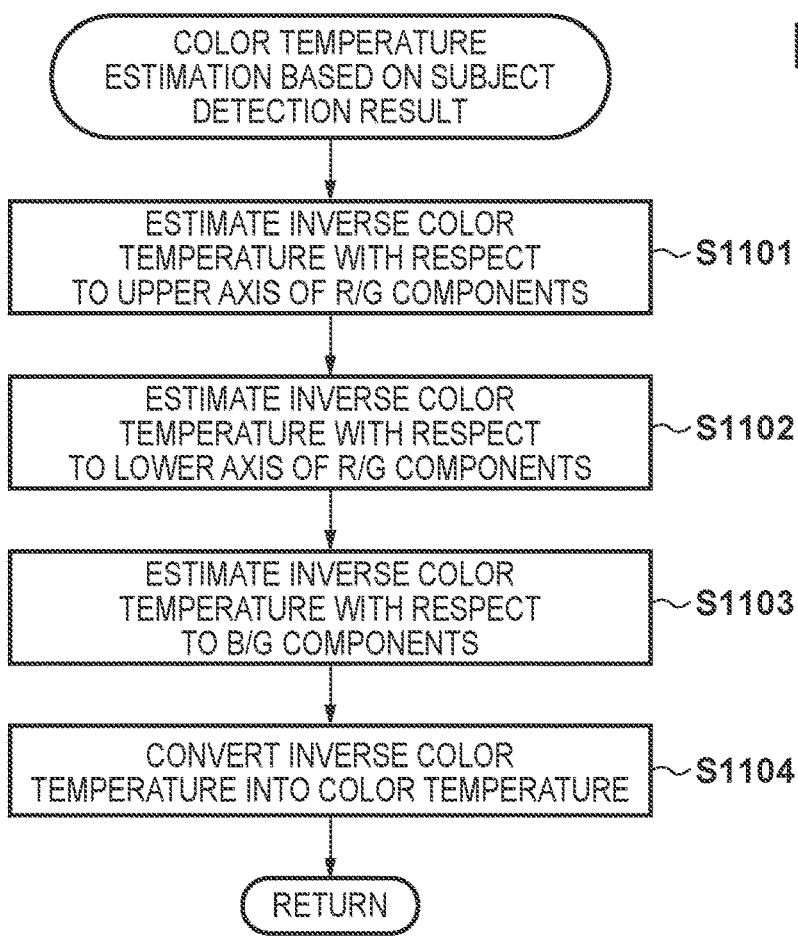
FIG. 11 is a flowchart related to color temperature estimation processing based on subject detection in an embodiment.

FIG. 11 is a flowchart related to color temperature estimation processing in the light source color estimation unit 210. Also, FIG. 10B shows elements associated with the color temperature estimation among the elements shown in FIG. 10A, and coordinates.

It is assumed that, with regard to coordinates 1008 to 1011 corresponding to the vertices of the color detection frame 1001, the inverse color temperature of a light source (the reciprocal of the color temperature) has been stored in, for example, the light source color estimation unit 210 in advance. The coordinates 1008 and 1010 are vertices on the low color temperature side, whereas the coordinates 1009 and 1011 are vertices on the high color temperature side.

In step S1101, the light source color estimation unit 210 performs linear interpolation with respect to the coordinates 1008 and 1009 to obtain the coordinates 1012 (inverse color temperature) on the upper outer edge of the color detection frame 1001, which correspond to the R/G components of the coordinates 1007.

In step S1102, the light source color estimation unit 210 performs linear interpolation with respect to the coordinates 1010 and 1011 to obtain the coordinates 1013 (inverse color temperature) on the lower outer edge of the color detection frame 1001, which correspond to the R/G components of the coordinates 1007.

In step S1103, the light source color estimation unit 210 calculates the inverse color temperature corresponding to the B/G components of the coordinates 1007 by performing linear interpolation with respect to the inverse color temperature of a light source corresponding to the coordinates 1012 and the inverse color temperature of a light source corresponding to the coordinates 1013.

In step S1104, the light source color estimation unit 210 estimates the color temperature of ambient light at the time of shooting by converting the inverse color temperature calculated in step S1103 into the color temperature. The light source color estimation unit 210 outputs the obtained color temperature to a subject WB correction value calculation unit 211.

(Step S407: Calculation of WB Correction Value Based on Estimated Color Temperature of Light Source)

Figure 10C:
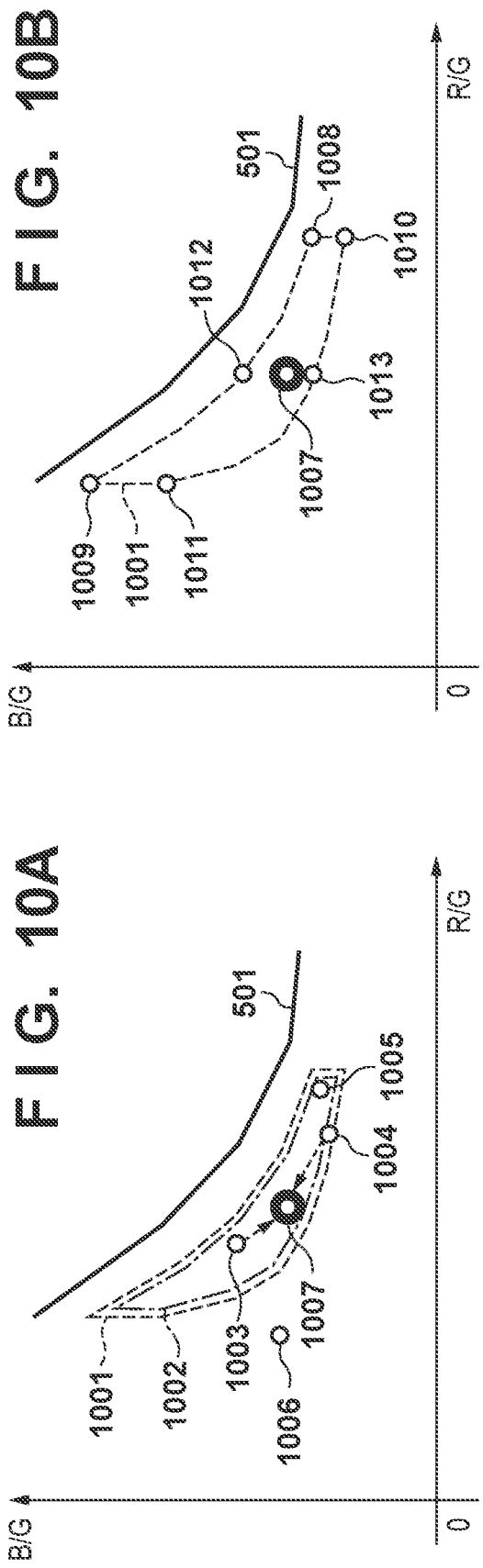

The subject WB correction value calculation unit 211 calculates a WB correction value (subject WB correction value) based on the estimated value of the color temperature of the light source corresponding to the coordinates 1007, which is output from the light source color estimation unit 210. Using FIG. 10C, the following describes the subject WB correction value. In FIG. 10C, the elements that are the same as those in FIG. 10A are given the same reference numerals thereas.

The subject WB correction value calculation unit 211 calculates coordinates (RGg, BGg) of a point on the blackbody radiation trajectory 501 corresponding to the color temperature corresponding to the specific color detected by the subject detection unit 206. Then, using the expressions (7), the subject WB correction value calculation unit 211 calculates a subject WB correction value corresponding to the coordinates (RGg, BGg).

$R$ gain $IR\_WB\_R$gain for subject $WB$ correction value=1/$RGg$ $G$ gain $IR\_WB\_R$gain for subject $WB$ correction value=1/$RGg$ value=1

B gain IR_WB_Bgain for subject WB correction value=1/BGg       (7)

(Step S408: Calculation of Final WB Correction Value)

The mixed WB correction value calculation unit 214 calculates a final WB correction value (mixed WB correction value) by adding the white WB correction value and the subject WB correction value at a predetermined ratio calculated by the weight calculation unit 213.

Figure 10D:
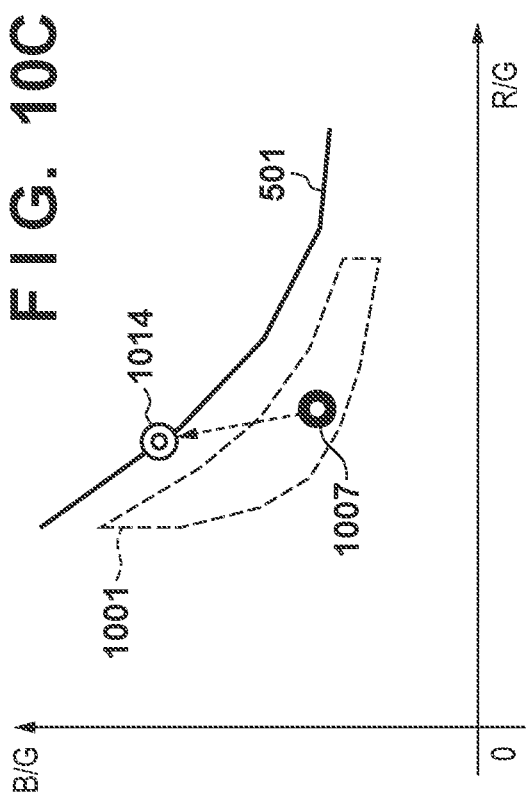
Figure 12:
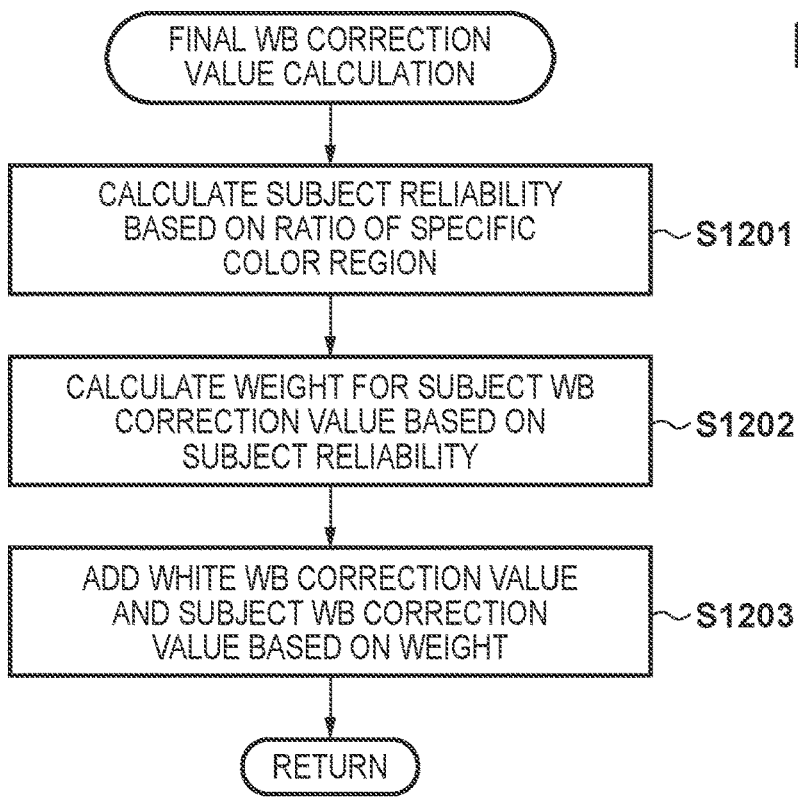
FIG. 12 is a flowchart related to the operations of generating a mixed WB correction value in an embodiment.

Using a flowchart shown in FIG. 12 and FIG. 10D, the following describes processing for calculating the final WB correction value from the white WB correction value and the subject WB correction value. In FIG. 10D, the elements that are the same as those in FIG. 10C are given the same reference numerals thereas.

In step S1201, the weight calculation unit 213 calculates subject reliability Tspecific based on the ratio Nratio of the partial regions that have the color to be detected to the image data that underwent the simple development. Note that the relationship between the ratio Nratio and the subject reliability Tspecific may be, for example, the relationship shown in FIG. 7D. Also note that, in FIG. 7D, the counted value Ntotal may be used in place of the ratio Nratio. Basically, the relationship can be such that the larger the ratio Nratio or the counted value Ntotal, the higher the subject reliability Tspecific. The weight calculation unit 213 stores a table or a mathematical formula that indicates the relationship of FIG. 7D, and calculates the subject reliability Tspecific with use of the ratio Nratio or the counted value Ntotal.

In step S1202, using the expression (8), the weight calculation unit 213 calculates a weight Ratio_WB for the subject WB correction value based on the subject reliability Tspecific. Note, although the reliability Twhite of the white WB correction value calculated in step S403 is taken into account here, the weight Ratio_WB may be calculated using the reliability of one of the white WB correction value and the subject WB correction value.

Ratio_WB=Twhite×Tspecific/100       (8)

In step S1203, using the expression (9), the mixed WB correction value calculation unit 214 calculates the final WB correction value (mixed WB correction value) WB_Rmix by performing weighted addition of the white WB correction value and the subject WB correction value based on the weight Ratio_WB.

WB_Rmix=(WB_Rw×(100−Ratio_WB)+WB_Rspecific×Ratio_WB)/100       (9)

Here, WB_Rw denotes the R gain for the white WB correction value, WB_Rspecific denotes the R gain for the subject WB correction value, and WB_Rmix denotes the R gain for the mixed WB correction value. The mixed WB correction value calculation unit 214 calculates the G gains and the B gains similarly to the R gains.

In FIG. 10D, the (R/G, B/G) coordinates 1014 correspond to the subject WB correction value, the (R/G, B/G) coordinates 1015 correspond to the white WB correction value, and the (R/G, B/G) coordinates 1016 correspond to the mixed WB correction value.

As shown in FIG. 10D, the (R/G, B/G) coordinates 1016 corresponding to the mixed WB correction value are the coordinates that divide a straight line connecting between the (R/G, B/G) coordinates 1014 and the (R/G, B/G) coordinates 1015 in accordance with the weight Ratio_WB. By performing weighted addition in the foregoing manner, the transition between the white WB correction value and the subject WB correction value (i.e., a change in the mixed WB correction value due to a change in the weight) can be made smooth.

The image processing circuit 105 uses the mixed WB correction value obtained in the foregoing manner in the development processing for the RAW data stored in the primary storage apparatus 104.

In the present embodiment, the final WB correction value can be obtained based on the white WB correction value, which is calculated based on detection of white pixels, and the subject WB correction value, which is calculated based on subject detection. Therefore, for example, when it is determined that the reliability of the white WB correction value is not high, the WB correction value with higher reliability can be obtained by calculating the WB correction value that reflects the subject WB correction value.

Also, the use of machine learning in subject detection enables highly accurate detection of natural green, which has been conventionally detected using infrared light and which is considered to be a difficult color in, for example, WB control. Furthermore, machine learning enables learning of not only natural green, but also subjects with colors that have been difficult to handle with infrared light, such as human skin colors. Moreover, the weight for the subject WB correction value, which is taken into account in connection with the white WB correction value, is controlled by determining the credibility of the result of subject detection by machine learning; in this way, the influence of low subject detection accuracy on the mixed WB correction value can be suppressed.

Second Embodiment

Next, a second embodiment of the present invention will be described. As the present embodiment is the same as the first embodiment except for weight calculation processing in the WB control unit, the following description will focus on the differences. In the present embodiment, the reliability indicating whether a shooting scene is a specific shooting scene is reflected in the weight for the subject WB correction value. Although the following describes an exemplary case where the specific shooting scene is an outdoor scene, similar application is possible also in the case of a scene other than the outdoor scene.

Figure 13:
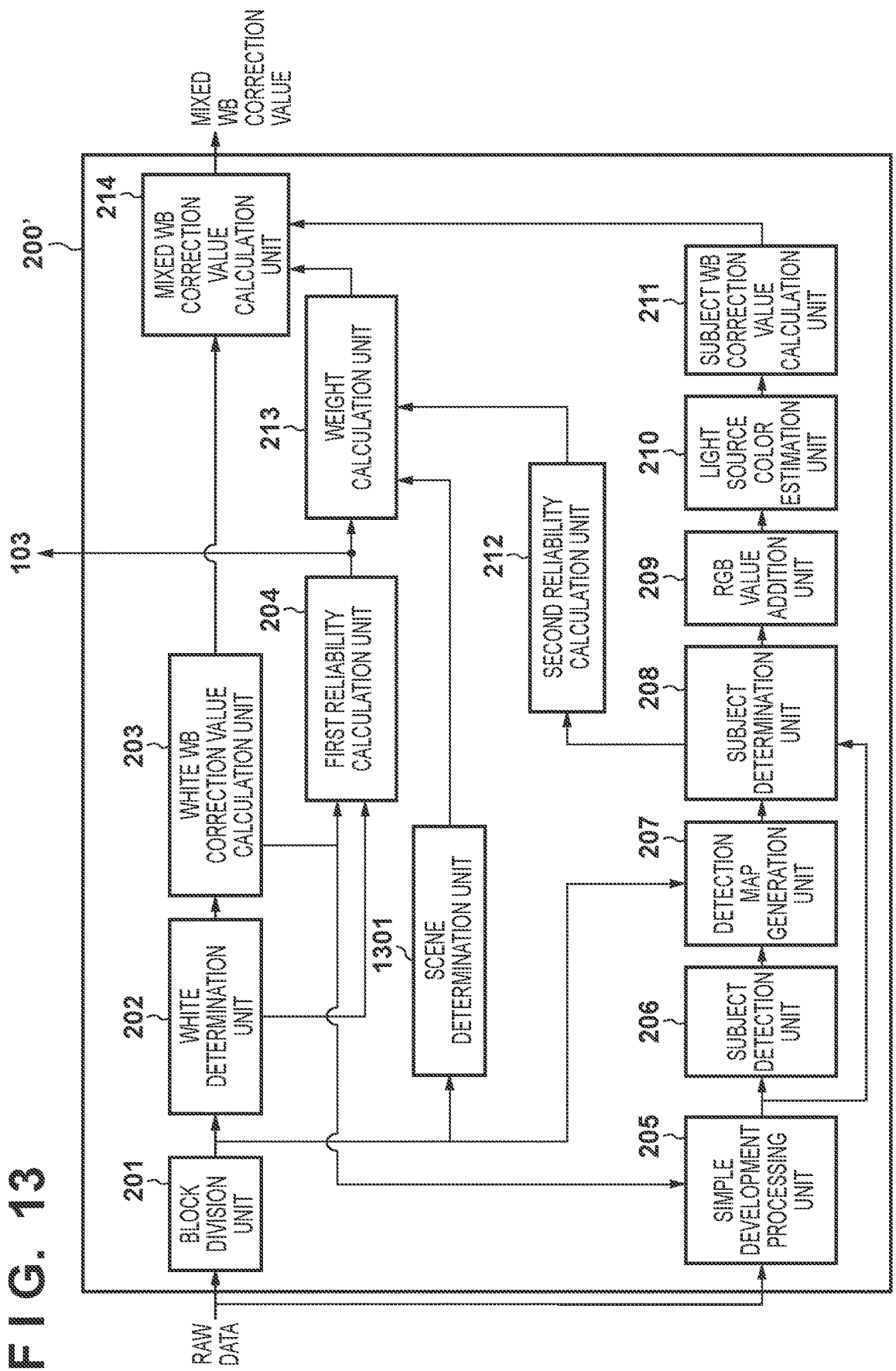
FIG. 13 is a block diagram showing an exemplary configuration of a white balance control unit realized by an image processing circuit of a second embodiment.

FIG. 13 is a block diagram showing an exemplary functional configuration of a WB control unit 200' according to the present embodiment; constituents that are similar to those of the first embodiment are given the same reference numerals as in FIG. 2 to omit duplicate explanations. The WB control unit 200' includes a scene determination unit 1301.

The scene determination unit 1301 calculates the reliability (likelihood) of a condition in which a shooting scene is the specific scene based on RAW data output from the block division unit 201. Note that the scene determination may be made using image data for display that was generated immediately before the detection of the ON state of SW2. Furthermore, the specific scene can be changed in accordance with a shooting mode, or in accordance with user settings. The specific scene can be a scene in which there is a high possibility of existence of a subject with a specific color to be detected by the subject detection unit 206. In this way, when there is a low possibility of a scene in which a subject with the specific color can exist even if the reliability of the subject detection result is high, the influence of the subject WB correction value on the mixed WB correction value can be suppressed.

It is assumed that the determination conditions for each specific scene have been stored in the scene determination unit in advance. As the scene determination can be made using a known technique, the description of the details of the method of determining each scene is omitted. Note that other information and an external apparatus may be used in the scene determination. For example, when the camera 100 can obtain position information based on a positioning method that uses a GPS, a wireless base station, and the like, the obtained position information can be transmitted to the external apparatus, and the scene determination can be made by making an inquiry about what kind of place the location information indicates.

It is assumed here that, in order to obtain the reliability of a condition in which a shooting scene is the outdoor scene, the scene determination unit 1301 generates pieces of luminance information for pieces of block data, respectively, and calculates the reliability Toutdoor of the condition in which the shooting scene is the outdoor scene based on the magnitude of the average luminance in the entire shot image, for example. It is assumed here that a scene with high luminance has a high possibility of being the outdoor scene. Therefore, the outdoor scene reliability Toutdoor can be calculated in accordance with a relationship obtained by plotting the luminance along the horizontal axis and the outdoor scene reliability Toutdoor along the vertical axis in FIG. 7A. The relationship between the luminance and the outdoor scene reliability Toutdoor has been stored in the scene determination unit 1301 in advance in the form of, for example, a table or a calculation formula.

Figure 14:
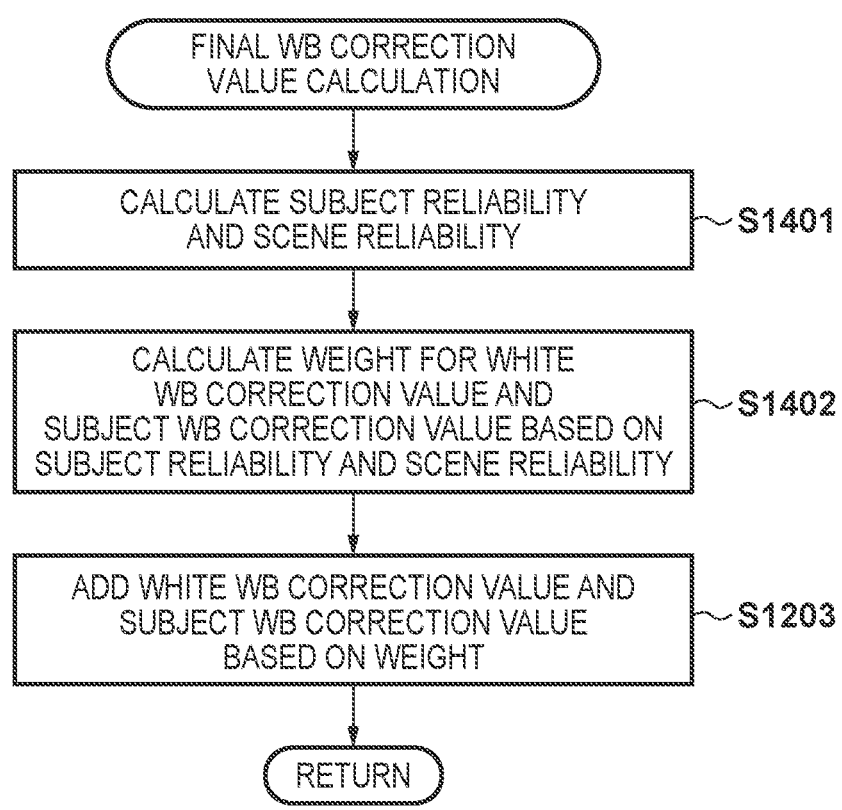
FIG. 14 is a flowchart related to the operations of generating a mixed WB correction value in the second embodiment.

FIG. 14 is a flowchart related to processing for calculating a final WB correction value, which is performed in step S408 of FIG. 4 in the second embodiment. Processing steps that are similar to those in the first embodiment are given the same reference numerals as in FIG. 12 to omit duplicate explanations.

In step S1401, the weight calculation unit 213 calculates a subject reliability Tspecific similarly to step S1201. Also, the scene determination unit 1301 calculates the reliability of the specific scene (here, the outdoor scene reliability Toutdoor).

In step S1402, using the expression (10), the weight calculation unit 213 calculates a weight Ratio_WB2 for the subject WB correction value based on the subject reliability Tspecific and the outdoor scene reliability Toutdoor that was calculated by the scene determination unit 1301.

$$\text{Ratio\_WB2} = \text{Tspecific} \times \text{Toutdoor}/100 \quad (10)$$

In step S1403, using the expression (9), the mixed WB correction value calculation unit 214 calculates the final WB correction value (mixed WB correction value) WB_Rmix by performing weighted addition of the white WB correction value and the subject WB correction value based on the weight Ratio_WB2.

$$\text{WB\_Rmix} = (\text{WB\_Rw} \times (100 - \text{Ratio\_WB2}) + \text{WB\_Rspecific} \times \text{Ratio\_WB2})/100 \quad (9)'$$

In the present embodiment, the reliability of a condition in which a shooting scene is the specific shooting scene is reflected in the weight for the subject WB correction value. For example, a scene in which there is a high possibility of existence of a subject to be detected is used as the specific shooting scene; in this way, the accuracy of the mixed WB correction value can be further improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-30851, filed on Feb. 26, 2020, which is hereby incorporated by reference herein in its entirety.

What is claimed is:

1. An image processing apparatus, comprising:
an image processing circuit that functions as:
a white detection unit that detects a white region from image data;
a first calculation unit that calculates a first white balance correction value based on data of the white region;
a generation unit that generates a detection map representing a detection result of a region of a subject that has a preset specific color, based on information output using machine learning, wherein the detection map represents, for each of partial regions of the image data, reliability based on the detection result;
a second calculation unit that calculates a second white balance correction value based on a color of partial regions determined based on the detection map; and
a third calculation unit that calculates a third white balance correction value based on the first white balance correction value and the second white balance correction value, the third white balance correction value being a white balance correction value that is applied to the image data.

2. The image processing apparatus according to claim 1, wherein
when reliability of the first white balance correction value is determined to be high, the first white balance correction value is used as the white balance correction value that is applied to the image data, and
when the reliability of the first white balance correction value is not determined to be high, the third white balance correction value is used as the white balance correction value that is applied to the image data.

3. The image processing apparatus according to claim 1, wherein
the preset specific color is a greenish color or a skin color.

4. The image processing apparatus according to claim 1, wherein
the third calculation unit calculates the third white balance correction value by performing weighted addition of the first white balance correction value and the second white balance correction value.

5. The image processing apparatus according to claim 4, wherein
a weight used in the weighted addition is based on reliability of at least one of the first white balance correction value and the second white balance correction value.

6. The image processing apparatus according to claim 5, wherein
the weight used in the weighted addition is further based on reliability of a condition in which a shooting scene is a specific scene.

7. The image processing apparatus according to claim 6, wherein
the specific scene is an outdoor scene.

8. The image processing apparatus according to claim 1, wherein
the second calculation unit calculates the second white balance correction value based on the specific color and on a color temperature of a light source.

9. The image processing apparatus according to claim 8, wherein
the second calculation unit estimates the color temperature of the light source based on data that has a color included in a preset range among the image data.

10. An image capture apparatus, comprising:
an image sensor;
an image processing apparatus that calculates a white balance correction value from image data obtained by the image sensor, wherein the image processing apparatus comprises an image processing circuit that functions as:
a white detection unit that detects a white region from image data;
a first calculation unit that calculates a first white balance correction value based on data of the white region;
a generation unit that generates a detection map representing a detection result of a region of a subject that has a preset specific color, based on information output using machine learning, wherein the detection map represents, for each of partial regions of the image data, reliability based on the detection result;
a second calculation unit that calculates a second white balance correction value based on a color of partial regions determined based on the detection map; and
a third calculation unit that calculates a third white balance correction value based on the first white balance correction value and the second white balance correction value; and
a development unit that applies development processing to the image data with use of the third white balance correction value.

11. An image processing method executed by an image processing apparatus, the image processing method comprising:
detecting a white region from image data;
calculating a first white balance correction value based on data of the white region;
generating, based on information output using machine learning, a detection map representing a detection result of a region of a subject that has a preset specific color, wherein the detection map represents, for each of partial regions of the image data, reliability based on the detection result;
calculating a second white balance correction value based on a color of partial regions determined based on the detection map; and
calculating a third white balance correction value based on the first white balance correction value and the second white balance correction value, the third white balance correction value being a white balance correction value that is applied to the image data.

12. A non-transitory machine-readable medium that stores a program for causing a computer to execute an image processing method comprising:
detecting a white region from image data;
calculating a first white balance correction value based on data of the white region;
generating, based on information output using machine learning, a detection map representing a detection result of a region of a subject that has a preset specific color, wherein the detection map represents, for each of partial regions of the image data, reliability based on the detection result;
calculating a second white balance correction value based on a color of partial regions determined based on the detection map; and
calculating a third white balance correction value based on the first white balance correction value and the second white balance correction value, the third white balance correction value being a white balance correction value that is applied to the image data.

13. The image processing apparatus according to claim 1, wherein the information output using machine learning represents a probability that a pixel or block of the image data is the region of the subject that has the preset specific color.

14. The image processing apparatus according to claim 1, wherein the machine learning is used to output a pixel or block of the image data that has a green color of a plant.

* * * * *